Figure 1:
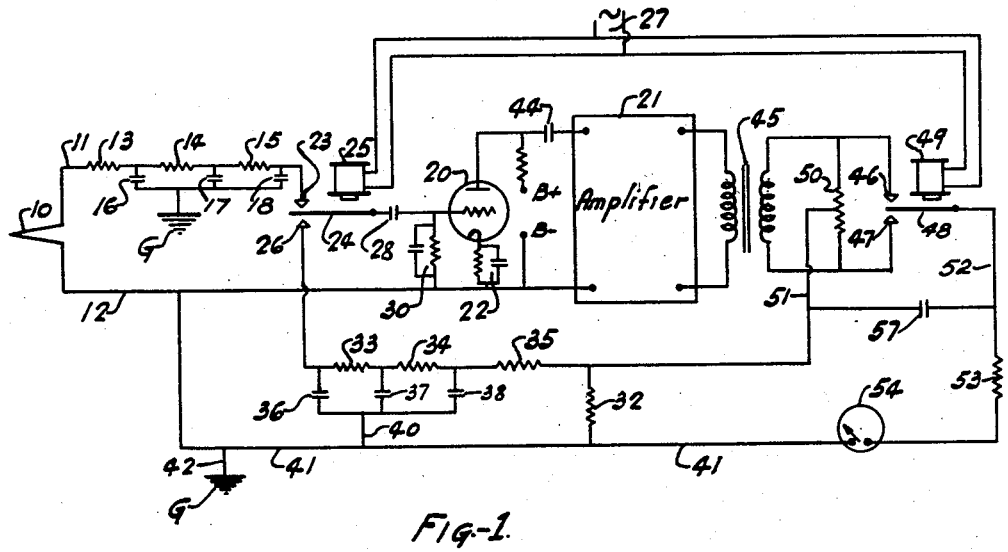

Jan. 18, 1949.  A. J. WILLIAMS, JR  2,459,730
MEASURING SYSTEM WITH CAPACITOR HAVING CHARACTERISTICS
OF AN INFINITE CAPACITY
Filed June 30, 1944

INVENTOR.
ALBERT J. WILLIAMS JR.
BY
Virgil E. Woodcock
Attorney.

Patented Jan. 18, 1949

2,459,730

UNITED STATES PATENT OFFICE 2,459,730

MEASURING SYSTEM WITH CAPACITOR HAVING CHARACTERISTICS OF AN INFINITE CAPACITY

Albert J. Williams, Jr., Philadelphia, Pa., assignor to Leeds and Northrup Company, Philadelphia, Pa., a corporation of Pennsylvania Application June 30, 1944, Serial No. 542,899

7 Claims. (Cl. 171—95)

This invention relates to measuring systems and has for an object the provision of relatively simple, though reliable, measuring systems of the electronic type in which exceedingly high accuracy may be attained in the measurement of direct currents or direct current potentials of low magnitude.

More particularly, electrical energy, in the form of low frequency alternating current or a direct current electromotive force, produced in response to a variable condition (such as voltage, current, temperature, or the like) is repeatedly interrupted in effect to convert the applied energy into alternating current. The alternating current electromotive force, so derived, is applied to the input of an amplifier having an output circuit which includes means for rectifying the amplified alternating current. The rectified current is then utilized to produce in the input circuit an electromotive force whose instantaneous polarity is opposite to that of the applied electromotive force. Accordingly, the amplifier responds to the difference between the two electromotive forces. In consequence, the output current is proportional to the magnitude of the applied electromotive force. By measuring the magnitude of the output current, a direct indication is had of the magnitude of the applied electromotive force, notwithstanding its magnitude may be of a very low order. For example, it may be only a few microvolts.

Direct current amplifiers have heretofore been proposed for measurement of unidirectional electromotive forces, but they are not satisfactory for the amplification and measurement of electromotive forces of the magnitude produced by thermocouples and other similar low potential condition-responsive devices. Deflection instruments of great sensitivity have also been used for measurement of potentials of small magnitude but instruments of this character are not suitable where vibration and mechanical shocks are unavoidable.

In accordance with the present invention, measuring systems are provided which are not subject to shock or vibration and which amplify and accurately measure direct current potentials of exceedingly small magnitude.

In accordance with a further aspect of the invention, there is reduced to a negligible degree the residual unbalance which has heretofore been present in measuring systems of the null type. Though such residual unbalance may be small, it nevertheless limits the ultimate accuracy of a measuring system. For example, in mechanical systems, the residual unbalance present may be due to the lost motion between, or only to the flexure of, the parts. But such a residual unbalance is enough to reflect in a lowered accuracy of the system. In electrical systems of the type heretofore proposed, a variable potential applied to the input circuit of a direct current amplifier produced an output current which, through a resistor, produced a potential difference which opposed the input voltage. An ammeter in the output circuit was then calibrated in terms of the input voltage. For applications where such systems were otherwise satisfactory, there was, nevertheless, present a residual unbalance due to the fact there must always exist a slight potential difference between the applied potential and that fed back in order to insure that the amplifier would maintain the new value of output current. In other words, there must always be a proper and sufficient potential difference between the grid and cathode to maintain the needed value of output current.

In order to apply the signal voltage to the input circuit of a thermionic amplifier, integrating capacitors have been used. The voltage across such a capacitor is a function of the integral with respect to time of the current flowing into the capacitor. When this current stops flowing, the capacitor tends to lose its charge due to discharge through its own charging circuit. This also gives rise to residual unbalance. Such losses must be supplied by the input or charging circuit.

In carrying out the present invention in one form thereof, the input signals whose magnitude is to be measured are modulated to produce an alternating current signal of readily amplifiable frequency. The A. C. signal after desired amplification is then demodulated to produce an output signal of character identical with that of the applied signals but of amplified magnitude. The output signal is utilized to produce in the input circuit a voltage whose instantaneous polarity opposes that of the applied signals. Hence, the magnitude of the amplified and demodulated signal becomes a measure of the magnitude of the applied signal. Hence, a rugged, vibration and shockproof, measuring instrument may be, and is, used for measuring the magnitude of the demodulated output. This instrument is preferably calibrated directly in terms of the magnitude of the condition under measurement.

In accordance with a still further aspect of the present invention, a greater degree of amplification is attained with a stability of the amplifying circuits which has not heretofore been achieved.

It is well understood by those skilled in the art that a cascade of amplifying devices will produce any desired amount of amplification. However, as the gain is increased, the circuit and tube capacities, the inductive and extraneous fields, all tend to make the amplifier unstable. From such causes, parasitic oscillations are unavoidable. Such parasitic oscillations overload the tubes and thereby produce distortion, and hence, inaccuracy in the measurement of the applied signals.

In carrying out this further aspect of the invention, an alternating current amplifier is utilized to produce an amplified output of a magnitude within the capabilities of an essentially stable amplifier. The output is then rectified and applied to an integrating capacitor connected across the input circuit of a direct current amplifier. This second amplifier serves to further amplify the applied signals to within the capabilities of a stable direct current amplifier. Hence, without distortion, the original signal may be amplified to a degree heretofore beyond the achievement of those skilled in the art. The residual unbalance in the system as a whole is reduced as the amplification is increased. Hence, the greater amplification reduces to very great degree, such residual unbalance. Additionally, any tendency of the capacitor to discharge through its charging circuit is greatly minimized. This is accomplished by imparting to the capacitor the characteristics of an infinite capacity. Whenever the voltage of one plate of the capacitor is made slightly more positive, the opposite plate of the capacitor is to the same degree made more negative. This makes possible the maintenance of substantially ground potential on the grid or input side of the capacitor. Hence, there is but little, a negligible, tendency of the capacitor to lose its charge through the input or supply circuit. Moreover, upon a rise in voltage across the capacitor, the current flowing into the capacitor is not reduced. The capacitor is a perfect integrator and has the characteristics of an infinite capacity.

Figure 2:
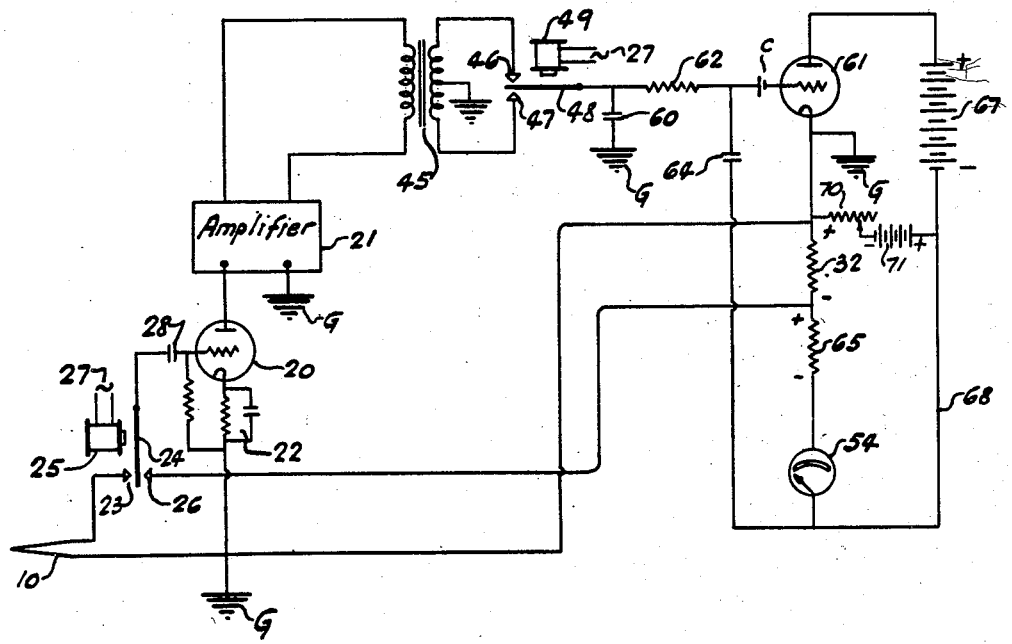

For a more detailed explanation of the invention, and for further objects and advantages thereof, reference is to be had to the following detailed description, taken in conjunction with the accompanying drawings, in which:

Fig. 1 is a wiring diagram which diagrammatically illustrates one form of the invention; and Fig. 2 is a wiring diagram diagrammatically illustrating another form of the invention.

Referring to the drawings, the invention in one form has been illustrated as applied to the measurement of temperature to which a thermocouple 10 may be subjected, although it is to be understood the invention is applicable to the measurement of any direct current or potential which varies with, or as a function of, the magnitude of a condition, such, for example, as pressure, rate of flow, voltage, current, power, or the like.

As well understood by the art, the thermocouple 10, in response to the difference in temperature between its hot junction and its cold junction, produces a potential difference. This potential difference or electromotive force is applied across a circuit including conductors 11 and 12. One side of the circuit includes resistors 13, 14 and 15 and capacitors 16, 17 and 18, which together form a filtering circuit for by- passing to ground G alternating current which may be induced in, or picked up by, the foregoing circuit. It will be observed the conductor 12 leads to the cathode of the first stage or tube 20 of a thermionic amplifier 21, this connection being completed through a conventional resistor-capacitor cathode-biasing means 22. The other side of the circuit extends from the resistor 15 to a stationary contact 23 of a circuit maker and breaker, or vibrator 24, operable by a coil 25 to connect the grid of the tube or valve 20 first to the contact 23 and then to another stationary contact 26. The operating coil 25 is energized from a suitable source of alternating current 27. The input circuit to the valve 20 includes a coupling capacitor 28 and there is also provided a grid leak and shunting capacitor 30.

The stationary contact 26, when engaged by the vibrator 24, connects the input circuit of valve 20 across another circuit which includes a resistor 32, by which there is produced a voltage or electromotive force for balancing the voltage or potential difference produced by the thermocouple 10. This branch circuit also includes a filter comprising resistors 33, 34 and 35 and capacitors 36, 37 and 38. This filter also serves to bypass to ground G, by way of conductors 40, 41 and 42, any alternating current which may appear in this circuit.

It will be observed the vibrator 24 performs several functions. First, it serves to interrupt the direct current or unidirectional potential applied by the thermocouple 10 to the input circuit of the valve 20. By continuously making and breaking this circuit, the direct current is converted to a pulsating current which, so far as the valve 20 is concerned, produces operation like that which would be produced by an alternating current; that is, it will readily pass through the capacitor 28, or through transformers which may step-up or multiply the voltage applied to the intermediate stages of the amplifier 21.

The second function of the vibrator 24 is periodically to apply to the input circuit of the valve 20 the potential difference across the resistor 32. Inasmuch as the input circuit is first connected across the thermocouple 10 and then across the resistor 32, it will be seen that the valve 20 responds to the difference between the potential of the thermocouple 10 and that across the resistor 32. The valve 20, serving as the first stage of the amplifier 21, amplifies or magnifies the resulting potential difference and applies it through a coupling capacitor 44 to the amplifier 21. The amplifier 21 preferably includes a plurality of stages of amplification for greatly increasing the magnitude of the potential differences or signals applied to the foregoing input circuit. These amplified signals or potential differences are then applied to the primary winding of an output transformer 45, the secondary winding of which has its respective ends connected to the stationary contacts 46 and 47 of a second vibrator 48. This vibrator is operated by means of a coil 49 from the same source 27 of alternating current. The vibrators 24 and 48 operate in synchronism. The secondary winding of the transformer 45 is shunted by a resistor 50. From a center tap of the resistor 50 there extends a conductor 51 which leads to one side of the resistor 32.

The vibrator 48 serves to complete the foregoing circuit to the resistor 32 by way of a conductor 52, resistor 53, a current-responsive device such as a milliammeter 54, and by conductor 41 to the other side of resistor 32. The vibrator 48 serves or functions as a full wave rectifier. Since it operates in synchronism with the vibrator 24 and inasmuch as the unidirectional or direct current potentials applied to the input circuit are converted into alternating current, it will be understood that the movement of the vibrator 48 to complete a circuit through the contacts 46 and 47 first to one side of the secondary winding and then to the other side of the secondary winding of the transformer 45, produces in the circuit, including resistor 32, a unidirectional or direct current. If the resistor 50 is omitted, it is to be understood the conductor 51 would then be connected to the mid-point of the secondary winding of transformer 45.

In order to stabilize the operation of the system as a whole, and to permit high gain in the amplification with avoidance of oscillations within the system, a capacitor 57 is connected across the vibrator 48 and the midpoint of resistor 50. The capacitor 57 is large in capacity, of the order of 1000 microfarads, as compared with the shunting or parallel capacities of the other elements of the circuit, whether these capacities be interelectrode capacities or those included in the circuit for other reasons, such as the filter capacitors. More specifically, the capacitor 57 and the time constant of the associated circuit, including the resistor 53, of the order of 1000 ohms, is large compared with the time constant or size of the capacities of each filter, including the resistors 33—35 and the capacitors 36—38.

With a system constructed and operated in accordance with the foregoing description, the unidirectional potential difference produced by the thermocouple 10 produces in the output circuit, including the meter 54, a direct current of relatively large magnitude. This current in flowing through the resistor 32 produces a potential difference which, as applied to the input circuit of the tube 20, opposes the applied potential difference applied by the thermocouple 10. If the temperature to which the thermocouple 10 is subjected increases, there is a corresponding increase in the potential difference produced thereby. This is reflected by a substantial increase in the output current through the circuit including the meter 54. However, this increased current, flowing through the resistor 32, increases the balancing potential produced thereby and this increase is of proper magnitude to balance the increased potential due to the aforesaid temperature rise.

It will now be apparent that the meter 54 may be calibrated in terms of the magnitude of the condition under measurement. For example, it may be calibrated in temperature. Its scale may be either in degrees centigrade or degrees Fahrenheit.

If the temperature of the thermocouple 10 decreases, the electromotive force produced thereby also decreases. The potential difference across the resistor 32 is then momentarily higher. Hence, the relative polarities of the applied signals are reversed and, in terms of alternating current, there is a phase shift of 180°. These same changes are reflected in the output circuit. The vibrator 48 functions as a demodulator or full wave rectifier and its output has a polarity opposite to that produced for a rising temperature. It follows that the capacitor 57 discharges, thus dropping the potential difference on the resistor 32. As soon as it is equal to that of the thermocouple 10, the corrective action disappears. Because of the action produced by a polarity change or phase shift, this form of the invention may be applied to input signals of unidirectional or alternating character.

In contrast with direct current electronic voltmeters and with direct current amplifying systems of the prior art, the permissible amplification and stability of the present system are materially greater than previously achieved. The system is not subject to vibration or magnetic disturbances except to a relatively small degree. The conversion of the direct current potential to alternating current greatly facilitates the design of the circuits. They are more efficient, more stable, and the overall results are materially and substantively better than heretofore achieved. More specifically, the milliammeter 54, of rugged construction, accurately measures to within five microvolts, that is, to within one percent of full scale, for input voltages of the order of from zero to 500 microvolts. It is to be further understood that the thermocouple 10 is illustrative of but one form of condition-responsive device. Devices of other types may be used and the input signals to the amplifier may be either direct or unidirectional in character or they may be alternating with a frequency below that which may be readily amplified. For frequencies which may not be readily amplified, the output from the amplifier is demodulated so that the instantaneous voltage drop across resistor 32 is always the same as that of the applied signal or the electromotive force whose magnitude is to be measured, as regards magnitude and polarity.

In accordance with the invention, the advantages of a null type system have been retained with elimination of the need for slidewires, standard cells, batteries, battery rheostats, and current standardizing systems.

Referring now to Fig. 2, corresponding circuits and circuit elements have been identified with the same reference characters as in Fig. 1. The condition-responsive device or thermocouple 10 is connected by the vibrator 24 to the input circuit of the first stage 20 of the amplifier 21, the output of which is connected by transformer 45 to the vibrator 48, which serves to rectify the alternating output current. The rectified output current is applied to a capacitor 60 connected to ground G. The potential across the capacitor 60 is applied to the input circuit of an integrator stage represented by the valve 61. This input circuit includes a resistor 62. If this resistor 62 is omitted, the input circuit may be connected directly to a current source, in which case the capacitor 60 would also be omitted. The other circuit connections would remain unchanged.

Whether the input signals or voltages be low frequency alternating current or direct current, the conversion thereof to alternating current of readily amplifiable frequency is accompanied by the production of a wide range of harmonics. The accompanying harmonics may be eliminated in conventional manner, as by filters or tuned circuits. Their presence, however, limits the overall gain of the amplifier if stable operation without parasitic oscillations is to be maintained. Such stable operation is most desirable in measuring systems and the gain of tube or valve 20 plus that of the amplifier 21 is not high enough to produce unstable operation. The additional gain which is desired is attained, by the direct current amplifier 61.

This amplifier 61 includes an integrating capacitor 64. It is connected from the grid of valve 61 and from one side of the input circuit through the current-responsive meter 54, a resistor 65, and by the resistor 32 to the other side of the input circuit, the ground G, and to the cathode of tube 61. The capacitor 64 is fairly large. It may be of the order of four microfarads. It is preferably a high grade, minimum loss, capacitor. For example, it may be a high grade mica type of capacitor. In this connection, it is to be understood capacitors may be made nearly perfect. The potential rise across the capacitor 64 is directly proportional to the time integral of the current flowing into it. This potential difference or the voltage across the capacitor 64 controls the bias or potential of the grid of the electric valve 61. As this voltage rises, the grid becomes less negative, and more current flows in the output circuit. As shown, a suitable biasing means for the grid, such as the battery C, is provided to insure operation of the valve 61 on the desired, or straight line, portion of its characteristic curve.

The output circuit includes a suitable source of anode potential as indicated by the battery 67. The output current flows from the battery 67, through the valve 61, the resistors 32 and 65, the meter 54, and by conductor 68 to the other side of the battery. The resistor 32 functions as in Fig. 1 to introduce into the input circuit a balancing potential. However, the resistors 32 and 65 perform a further and important function. The IR drop, or the polarity of the potential difference across the resistors 32 and 65, is in a direction such as to make more negative the cathode side of the capacitor 64. The grid side of the capacitor 64 operates at substantially ground potential but the cathode side thereof is negative to a degree dependent upon the magnitude of the current in the output circuit. This has the electrical effect of preventing a reduction in the current flowing into the capacitor, notwithstanding there is a voltage rise across the capacitor. Since the potential on the grid side of the capacitor rises but a small amount, and is always near ground potential, there is little tendency for discharge of the capacitor through the supply circuit including the resistor 62. This resistor 62 is preferably large, of the order of two megohms, and insures a minimum loss of potential by the capacitor 64. More particularly, as soon as the voltage across the capacitor 64 rises a small amount, the current through resistors 32 and 65 rises to increase negatively the bias on the cathode side of the capacitor. This increase of the negative bias on the cathode side of the capacitor takes place rapidly and its magnitude changes according to the amplification factor of the tube or valve 61. These features combine to make the residual unbalance, which has heretofore been present in order to maintain a new value of output current, a minimum.

Further in accordance with the invention, it will be observed a zero adjustment is provided by a resistor 70 and a battery 71. This resistor is adjusted so that when there is zero input, the meter 54 will read "zero." This provision is independent of the features already described. After adjustment of the zero position of the meter 54, the output current flowing through the meter 54 will be precisely related to the potential or to the current being measured. The resistor 32 is a high precision resistor, preferably of "Manganin," so that its resistance will not change with temperature or with changing current flow.

Specific values of circuit impedances will depend upon particular applications. In accordance with the system of Fig. 2, the capacitor 64 may have a capacity of four microfarads; the resistors 32, 65 and 62 may have resistances respectively of 5 ohms, 100,000 ohms and 2 megohms.

While preferred embodiments of the invention have been described, it will be understood that further modifications may be made without departing from the spirit and scope of the invention as set forth in the appended claims.

What is claimed is:

1. In a measuring system the combination of an electric valve having an anode, a cathode and a control grid, an input circuit connected to said grid and to said cathode, an integrating capacitor, means including a resistor between said capacitor and said cathode and between said capacitor and the cathode side of said input circuit for connecting said capacitor to said grid and to said cathode independently of the cathode side of said input circuit, means connected to said input circuit for charging said capacitor in response to variations of a condition, the change in voltage across said capacitor determining the conductivity of said valve, an output circuit for said valve including said resistor, said resistor in response to current in said output circuit producing a change in potential on the cathode side of said capacitor opposite to a change in potential on the grid side thereof to compensate for a voltage rise across said capacitor so that the current flowing into said capacitor is not reduced because of said voltage rise.

2. The combination with an electric valve having an input circuit to which signals may be applied and an output circuit for flow of current under the control of said input signals, of an integrating capacitor connected across said input circuit for control of said output current in response to an integration with respect to time of said input signals, and a resistor separate from said input circuit and included in series circuit relation with said capacitor on the cathode side thereof and traversed by said output current in direction to impart to said capacitor the characteristic of an infinite capacity.

3. A measuring system comprising an input circuit to which there may be applied a direct current electromotive force whose magnitude is to be measured, means for converting said direct current into alternating current, means including an amplifier for amplifying said alternating current, said amplifier having an output circuit, means included in said output circuit for rectifying said alternating current, a direct current amplifier having input and output circuits, means for minimizing residual unbalance in the system comprising an integrating capacitor connected to said input circuit, means for applying said rectified alternating current to said capacitor thereby to vary the charge on said capacitor, means included in both of said last-named input and output circuits and responsive to the output current for varying the potential on one side of said capacitor as its charge is increased or decreased to impart to it the characteristic of an infinite capacity, means in said first-named input circuit for producing in response to said last-named output current an electromotive force of polarity opposite to said applied electromotive force, and means for measuring the magnitude of said last-named output current to obtain an indication of the magnitude of said applied direct current electromotive force.

4. In a measuring system the combination of an electric valve having an anode, a cathode and a control grid, an input circuit connected between said grid and said cathode, an integrating capacitor having one side connected to the grid side of said input circuit, means including a resistor between said capacitor and said cathode and between said capacitor and the cathode side of said input circuit for connecting the other side of said capacitor to the cathode side of said input circuit, means for charging said capacitor in response to variations of a condition, the resultant change in voltage across said capacitor with reference to said cathode determining the conductivity of said valve, an output circuit for said valve including said resistor, said resistor in response to current in said output circuit producing a change in potential on the cathode side of said capacitor opposite to a change in potential on the grid side thereof so that upon a voltage change across said capacitor the current flowing into it is not changed.

5. The combination with an electric valve having an anode, a cathode and a control grid, an output circuit and a signal input circuit between said grid and cathode, of an integrating capacitor for said input circuit having one side thereof connected to the grid side of said input circuit, signal means for varying the charge of said capacitor, and a resistor between said other side of said capacitor and said cathode side of said input circuit operable in accordance with the current output of said valve for varying the potential on the cathode side of said capacitor as its charge is increased or decreased by signal input to impart to it the characteristic of an infinite capacity.

6. In a measuring system, the combination of an electric valve having an anode, a cathode and a control grid, a signal input circuit connected between said control grid and said cathode, an integrating capacitor one side of which is connected to the grid side of said input circuit for changing the potential of said grid relative to said cathode upon application of a signal to said input circuit, a resistor, means connecting said resistor between said other side of said capacitor and said cathode side of said input circuit, and means including said resistor operable in accordance with the output of said valve for producing with reference to the cathode a change in potential on the cathode side of said capacitor opposite to any change in potential on the grid side thereof so that flow of signal current to and from said capacitor is independent of the magnitude of the potential difference across said capacitor.

7. The combination with an electric valve having a source of anode supply, at least an anode, a cathode and a control electrode, of an output circuit, a signal input circuit connected between said control electrode and said cathode, a separate integrating circuit comprising a capacitor having one side thereof connected to the grid side of said input circuit, a resistor in series with said capacitor having the side remote from said capacitor connected to the cathode side of said input circuit, said resistor as a whole being electrically between the cathode side of said input circuit and said capacitor, and conductors connecting said resistor for flow of output current therethrough in a direction to make the capacitor side thereof negative with respect to said cathode.

ALBERT J. WILLIAMS, JR.

REFERENCES CITED

The following references are of record in the file of this patent:

UNITED STATES PATENTS

| Number | Name | Date |
| --- | --- | --- |
| 2,150,006 | Parker | Mar. 7, 1939 |
| 2,222,172 | Diminick | Nov. 19, 1940 |
| 2,297,543 | Eberhardt et al. | Sept. 29, 1942 |
| 2,323,762 | George | July 6, 1943 |

FOREIGN PATENTS

| Number | Country | Date |
| --- | --- | --- |
| 477,392 | Great Britain | Dec. 22, 1937 |